US012375559B2

(12) United States Patent
Szabó et al.

(10) Patent No.: US 12,375,559 B2
(45) Date of Patent: Jul. 29, 2025

(54) MANAGING DATA STORAGE IN A COMMUNICATION SYSTEM

(71) Applicant: Telefonaktiebolaget LM Ericsson (publ), Stockholm (SE)

(72) Inventors: Róbert Szabó, Budapest (HU); Ákos Recse, Halasztelek (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 10 days.

(21) Appl. No.: 18/579,650

(22) PCT Filed: Jul. 16, 2021

(86) PCT No.: PCT/EP2021/070031
§ 371 (c)(1),
(2) Date: Jan. 16, 2024

(87) PCT Pub. No.: WO2023/284984
PCT Pub. Date: Jan. 19, 2023

(65) Prior Publication Data
US 2024/0348685 A1    Oct. 17, 2024

(51) Int. Cl.
H04L 67/1097    (2022.01)
G06F 3/06    (2006.01)
H04B 7/185    (2006.01)

(52) U.S. Cl.
CPC ........ *H04L 67/1097* (2013.01); *G06F 3/0604* (2013.01); *G06F 3/0655* (2013.01); *G06F 3/067* (2013.01); *H04B 7/18513* (2013.01)

(58) Field of Classification Search
CPC ............. H04L 67/1097; H04B 7/18513; G06F 3/0604; G06F 3/0655; G06F 3/067

USPC ........................................................ 709/213
See application file for complete search history.

(56) References Cited

U.S. PATENT DOCUMENTS

| 7,869,383 | B2 | 1/2011 | Tabbara et al. |
| 8,266,237 | B2 | 9/2012 | Moore et al. |
| 9,032,061 | B1 | 5/2015 | Xin et al. |
| 9,710,330 | B2 | 7/2017 | Cronie |

(Continued)

OTHER PUBLICATIONS

International Search Report and Written Opinion issued in International Application No. PCT/EP2021/070031 dated Apr. 11, 2022 (15 pages).

(Continued)

*Primary Examiner* — Wing F Chan
*Assistant Examiner* — Leon Y Tseng
(74) *Attorney, Agent, or Firm* — Rothwell, Figg, Ernst & Manbeck, P.C.

(57) ABSTRACT

Methods and apparatus are provided. In an example aspect, a method of storing data in a communication system is provided. The data comprises n data blocks, and k data blocks of the n data blocks are required to recover the data. The communication system includes a plurality of clusters of data storage nodes including a first cluster that is a closest cluster of the plurality of clusters to a source of the data. The method comprises receiving, from a node associated with a respective network operator of each of the clusters of storage nodes, information identifying the data storage nodes that are in each of the clusters. The method also comprises causing each of at least k data blocks of the n data blocks to be stored in a different storage node in the first cluster.

20 Claims, 7 Drawing Sheets

(56) References Cited

U.S. PATENT DOCUMENTS

| | | | | |
|---|---|---|---|---|
| 10,659,523 B1* | 5/2020 | Joseph | ............... | H04L 67/10 |
| 12,164,378 B2* | 12/2024 | Khadiwala | ............ | G06F 3/064 |
| 2012/0102316 A1* | 4/2012 | Resch | ............. | G06F 11/1076 |
| | | | | 713/150 |
| 2014/0152476 A1* | 6/2014 | Oggier | ............ | H03M 13/373 |
| | | | | 341/94 |
| 2019/0342418 A1 | 11/2019 | Eda et al. | | |
| 2019/0349733 A1* | 11/2019 | Nolan | ............. | H04W 12/106 |
| 2021/0126826 A1* | 4/2021 | Nolan | ............. | G06F 16/1824 |

OTHER PUBLICATIONS

Abebe, M. et al., "EC-Store: Bridging the Gap Between Storage and Latency in Distributed Erasure Coded Systems", 2018 IEEE 38th International Conference on Distributed Computing Systems, 2018 (12 pages).

Storj Labs, Inc., "Storj: A Decentralized Cloud Storage Network Framework", Oct. 30, 2018 v3.0, htpps://github.com/storj/whitepaper (90 pages).

Bindal, R. et al., "Improving Traffic Locality in BitTorrent via Biased Neighbor Selection," 26th IEEE International Conference on Distributed Computing Systems (ICDCS'06), Lisboa, Portugal, 2006 (11 pages).

Vorick, D. et al., "Sia: Simple Decentralized Storage", Nebulous Inc., Nov. 29, 2014 (8 pages).

Lakshman, A. et al., "Cassandra—A Decentralized Structured Storage System", ACM SIGOPS Operating Systems Review (Apr. 2010) (7 pages).

\* cited by examiner

MANAGING DATA STORAGE IN A COMMUNICATION SYSTEM

CROSS REFERENCE TO RELATED APPLICATIONS

This application is a 35 U.S.C. § 371 National Stage of International Patent Application No. PCT/EP2021/070031, filed 2021 Jul. 16.

TECHNICAL FIELD

Examples of the present disclosure relate to managing data storage in a communications system.

BACKGROUND

Decentralized storage solutions are proposed in various solutions like Tardigrade or Sia, as disclosed in C. H. G. von Heyden, "Sia: Simple Decentralized Storage David," David Vor., vol. 16, pp. 368-370, 2014, which is incorporated herein by reference. These products use crowd-source capacity to offer an encrypted and reliable storage service. By means of these products, spare capacity of individuals (and businesses) is collected and sold to anyone who needs a storage solution. Capacity providers, as well as the capacity consumers, are connected to each other via the internet, over operators' already established connectivity networks.

Storj, as disclosed in "Storj: Decentralized cloud storage," V3.0, Oct. 30, 2018, https://www.storj.io/storjv3.pdf, which is incorporated herein by reference, is the underlying decentralized storage solution system of Tardigrade. This solution separates the supply (storage capacity) and the demand (storage need), and serves developers who want to rent a safe and scalable storage space. This solution handles and coordinates the spare capacity of storage node operators. In "Storj: Decentralized cloud storage", a threefold architecture is proposed, which shows an example of a decentralized storage system 100, see FIG. 1.

In the decentralized storage system 100, storage nodes 102 represent the spare capacity of individuals and businesses. Any device can join the system 100 in order to offer its spare capacity to other devices. As the devices with spare capacity are connected to the system 100, the system will start to utilize their free capacity by uploading data and compensate the device owners or their network operators with credit or money. Customer application 104 represents the demand side. After registering to the system, any device can start to upload data into the system based on an Application Programming Interface (API) key generated at the customer application 104. With the key, one can connect the uplink Command Line Interface (CLI) to the system 100, represented in FIG. 1 also by satellites 106. Satellites 106 represent a central coordinator entity in the system 100. The satellites have knowledge of multiple metrics about the storage nodes 102, while also being aware of the storage structure of users' data. Because data (which may be sensitive) is stored at a device other than a device that originally provided the data to be stored, encrypting the data as early as possible is crucial. The upload facility that uploads the data to the storage system, from the device that originally provides the data to be stored, has a built-in encryption with an erasure coding that prevents reading the data after the data leaves the device from which it was originally provided.

FIG. 2 shows an example of communications 200 within a decentralized data storage system, such as the system 100 shown in FIG. 1. In particular, FIG. 2 shows an example of how data is uploaded to the storage nodes. First, the upload facility in the client device 202 that is storing data contacts a satellite 204 of the storage system to notify it about an upload request to upload data (the prepare step 206 in FIG. 2). The satellite 204 will reply to the client 202 with the location (e.g. IP address) of storage nodes 202 where the data can be stored (the unrestricted allocation step 208). The number of these storage nodes depends on the system configuration, such as the resiliency and storage overhead. The selection of storage nodes, however, is based on the storage node reputation calculated by four subsystems:

1. As storage nodes connect to the system, they are in a proof of work stage. This practically means that before connecting storage capacity, the node operator must perform a hard computational problem. This helps the network avoid some Sybil attacks. The difficulty of the proof of work is configured in the satellite.
2. After joining to the system 100, storage nodes are unknown and not trusted. The next phase is a vetting process, that runs until enough data is collected about the node. When some data is uploaded, the system 100 selects already trusted storage nodes according to a satellite configuration, and besides these already trusted nodes, some storage nodes in vetting stage are selected. This way the system 100 can collect metrics from a new storage node without jeopardizing the required resiliency level.
3. The third subsystem filters (blocks) bad storages nodes. Some examples that makes a node blocked are failing too many audits; failing to return data with reasonable speed; and failing too many uptime checks. A blocked node must return to the vetting process again.
4. The last subsystem selects well-behaving storage nodes based on preference values. Such preference values are throughput, latency, history of reliability and uptime, and geographic location of the storage node. The selection is based on a process called power of two choices, which selects two nodes entirely at random, and then chooses the more qualified between those two.

After encryption and erasure coding the data is split into blocks. The PUT and DATA messages 210 shown in FIG. 2 show a collection of data blocks stored in one storage node.

SUMMARY

All of the storage systems referred to above operate in an over-the-top (OTT) manner. They do not consider boundaries such as autonomous system (AS) boundaries or operator network boundaries. As a result, such storage systems may generate an unwelcome amount of data traffic that transits between operator networks. OTT solutions do not consider network bottlenecks, and hence may cause congestion in networks or demand from network operators the installation of additional equipment.

One aspect of the present disclosure provides a method of managing data storage in a communication system, wherein the data comprises n data blocks and k data blocks of the n data blocks are required to recover the data, and wherein the communication system includes a plurality of clusters of data storage nodes including a first cluster that includes a node that is a source of the data. The method comprises receiving, from a node associated with a respective network operator of each of the storage nodes, information for identifying the clusters of storage nodes, and causing at least one data block of the n data blocks to be stored in a storage node in the first cluster.

A further aspect of the present disclosure provides apparatus for managing data storage in a communication system. The data comprises n data blocks and k data blocks of the n data blocks are required to recover the data. The network includes a plurality of clusters of data storage nodes including a first cluster that includes a node that is a source of the data. The apparatus comprises a processor and a memory. The memory contains instructions executable by the processor such that the apparatus is operable to receive, from a node associated with a respective network operator of each of the storage nodes, information for identifying the clusters of storage nodes, and cause each of at least one data block of the n data blocks to be stored in a storage node in the first cluster.

An additional aspect of the present disclosure provides apparatus for storing data in a communication system. The data comprises n data blocks and k data blocks of the n data blocks are required to recover the data. The network includes a plurality of clusters of data storage nodes including a first cluster that includes a node that is a source of the data. The apparatus is configured to receive, from a node associated with a respective network operator of each of the storage nodes, information for identifying the clusters of storage nodes, and cause each of at least one data block of the n data blocks to be stored in a storage node in the first cluster.

Advantages of example embodiments may include one or more of the following. For example, for the operator, who may wish to offer a data storage service, data traffic optimization means less traffic volume and hence lower capital expenditure. Unlike with over the top solutions, where data is aggressively moved across unfavorable links such as bottlenecks or inter-operator network links, in some examples, an operator's involvement in coordinating the data distribution may allow for capacity optimization and better read or write access times to data.

Example embodiments may not require revealing operators' networks' internal topology, e.g., areas, domains, routers, interconnections, link capacities, bottlenecks to the public. In some examples, this network topology information may only be revealed to certain nodes, such as a data storage coordinator. With a direct interface to the operator, the coordinator may be able to periodically update the network information it possesses, and thus quickly adapt to changes in the network and/or traffic conditions.

By fetching not only network topology but also policies for link usage, the operator can in some examples mark any link (let it be internal or external) as a bottleneck or otherwise non-preferred or unfavorable resource. The operator can apply any arbitrary metric or process to select these bottleneck links (e.g., insufficient resources, cost considerations, reserving bandwidth for other traffic).

Example embodiments may distribute data in a controlled way. As a result, the proper level of resiliency can be ensured, and a repairing policy may be initiated if this falls below a given level.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Figure 1:
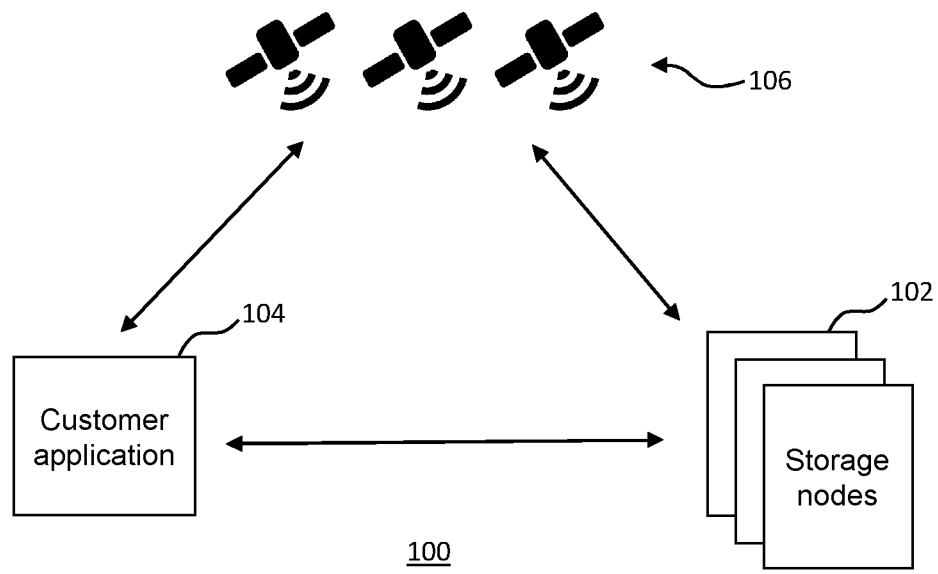
FIG. 1 shows an example of a decentralized storage system.
Figure 2:
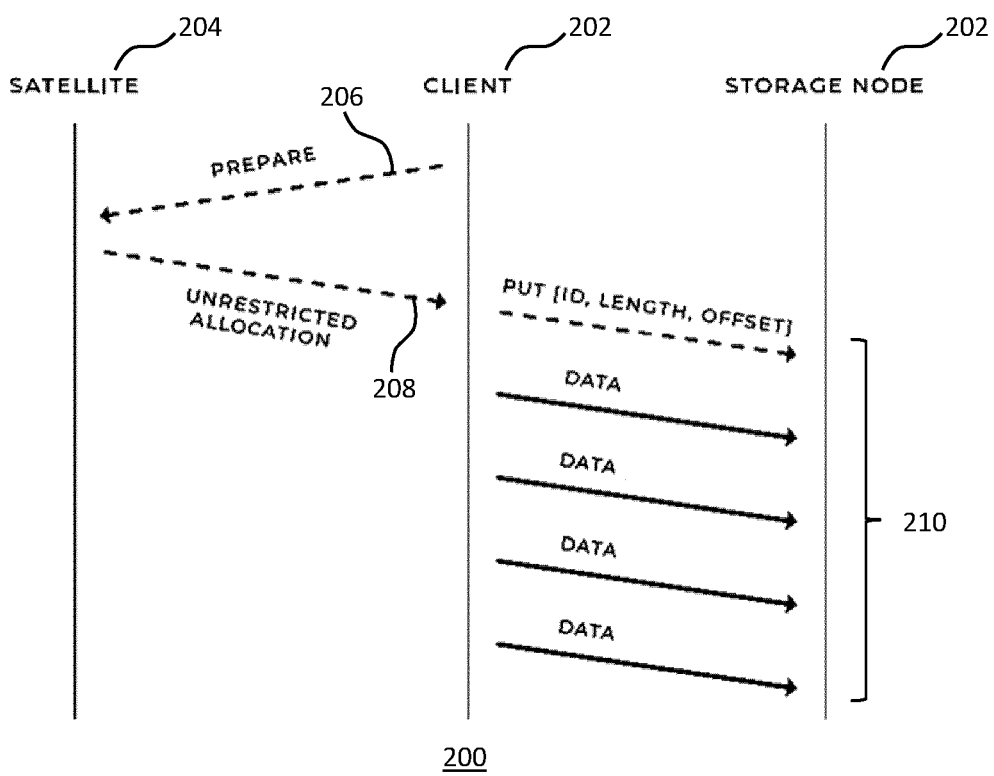
FIG. 2 shows an example of how data is uploaded to the storage nodes.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

As suggested above, prior decentralized storage systems may generate a large amount of data traffic that transits between operator networks, thereby causing congestion on network links or demanding from network operators such as the installation of additional equipment.

Embodiments of this disclosure may relate to decentralized storage systems where storage nodes are operated by "untrusted" entities, and storage nodes can come and go from the system without any preliminary notice. Embodiments of this disclosure may provide a network-enabled, decentralized storage solution, which optimizes data distribution and retrieval to and from storage nodes and considers clusters of storage nodes, such as those operating in or connected to different operators' networks and policies. An operator's policies can change in time and may reflect intents like smoothing traffic variations, avoiding paths with typical bottlenecks, keeping traffic local, using backup resources, avoiding expensive resources, etc. In embodiments provided herein, network enablement and optimization may be achieved by operators' involvement in the coordination of the data distribution and retrieval. In some examples, a network-aware coordinator node may select storage nodes based on their network infrastructure positions relative to the data source or sink.

In example embodiments, data may be broken into blocks, and the blocks stored at several data storage nodes in a communication network. In some examples, assuming that n is the number of generated data blocks that are generated from data to be stored, and k is the number of data blocks needed to recover the data, then n/k is the expansion factor for the decentralized storage system. Typical n/k values may be for example between 2.5-4.0 for resiliency reasons. The value of n/k suggests how many units of data storage are needed to store one unit of data in a resilient setup.

When storing data, a minimum of k+e storage nodes may be selected from the same cluster (or the nearest cluster to) where the data source is located, where e>=0 is a cluster resiliency factor. The rest of the storage nodes (n−k−e) may in some examples be selected based on resiliency requirements inside and/or outside of the originating (or nearest) cluster.

When retrieving data, for example, the storage nodes (min k) with replicas may be ranked according to their cluster assignment, where storage nodes within the same cluster as the retrieving entity are most preferred. In some examples, data blocks may be copied or moved with the objective to reduce or minimize data volume traversing cluster boundaries when retrieving data.

Advantages of example embodiments may include one or more of the following. For example, for the operator, who may wish to offer a data storage service, data traffic optimization means less traffic volume and hence lower capital expenditure. Unlike with over the top solutions, where data is aggressively moved across unfavorable links such as bottlenecks or inter-operator network links, in some examples, an operator's involvement in coordinating the data distribution may allow for capacity optimization and better read or write access times to data.

Example embodiments may not require revealing operators' networks' internal topology, e.g., areas, domains, routers, interconnections, link capacities, bottlenecks, to the public. In some examples, this network topology information may only be revealed to certain nodes, such as a data storage coordinator. With a direct interface to the operator, the coordinator may be able to periodically update the network information it possesses, and thus quickly adapt to changes in the network and/or traffic conditions.

By fetching not only network topology but also policies for link usage, the operator can in some examples mark any link (let it be internal or external) as a bottleneck or otherwise non-preferred or unfavorable resource. The operator can apply any arbitrary metric or process to select these bottleneck links (e.g., insufficient resources, cost considerations, reserving bandwidth for other traffic).

Example embodiments may distribute data in a controlled way. As a result, the proper level of resiliency can be ensured, and a repairing policy may be initiated if this falls below a given level.

Figure 3:
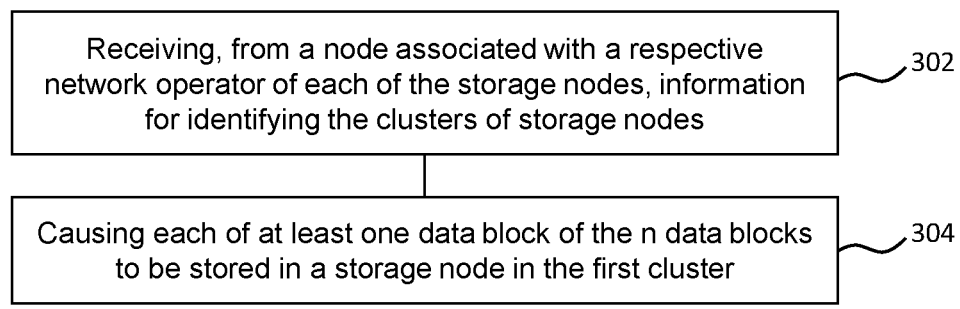
FIG. 3 is a flow chart of an example of a method of storing data in a communication system.

FIG. 3 is a flow chart of an example of a method 300 of storing data in a communication system. The method 300 of storing data may provide for example a decentralized or network storage system. The method 300 may be performed by a network node such as for example a coordinator node referred to above. The network node may be a node within a network associated with one of the operators offering data storage nodes, or may alternatively be outside of such networks such as for example within a different network.

The data to be stored comprises n data blocks, and k data blocks of the n data blocks are required to recover the data. That is, for example, the data may be fully recovered in its entirety from any k blocks. An example of a coding mechanism for creating the n blocks from the original data is Reed-Solomon error correction coding. The communication system includes a plurality of clusters of data storage nodes, including a first cluster that includes a node that is a source of the data. For example, the first cluster may be the closest cluster to the data source. Here, "closest" may mean in geographical terms, but alternatively may be in network terms, e.g. with the fewest number of links (e.g. congested or non-preferred links) or communication costs, bandwidth, delay or latency etc. as compared to other clusters. Also, the first cluster that "includes" the data source node may mean that for example the data source is within or is connected or attached to a node in the first cluster, or alternatively may mean for example that the data source node is considered as being included in the first cluster for the purposes of the method 300, and the first cluster may be the closest cluster as suggested above.

The clusters may be for example clusters of data storage nodes that are connected to one or more nodes (e.g. network equipment such as aggregators, switches, routers or gateways in data centers) in a same geographical area; one or more nodes in a same network domain (e.g. a regional collection of network nodes, a technology specific collection of network nodes, a layer, an administrative area, or some other operator-defined domain); one or more nodes that are operated by a same network operator; and/or one or more nodes that are separated from other clusters of data storage nodes by one or more links that are bottleneck links, non-preferred links, low bandwidth links, high cost links, peer links and/or transit links.

Figure 4:
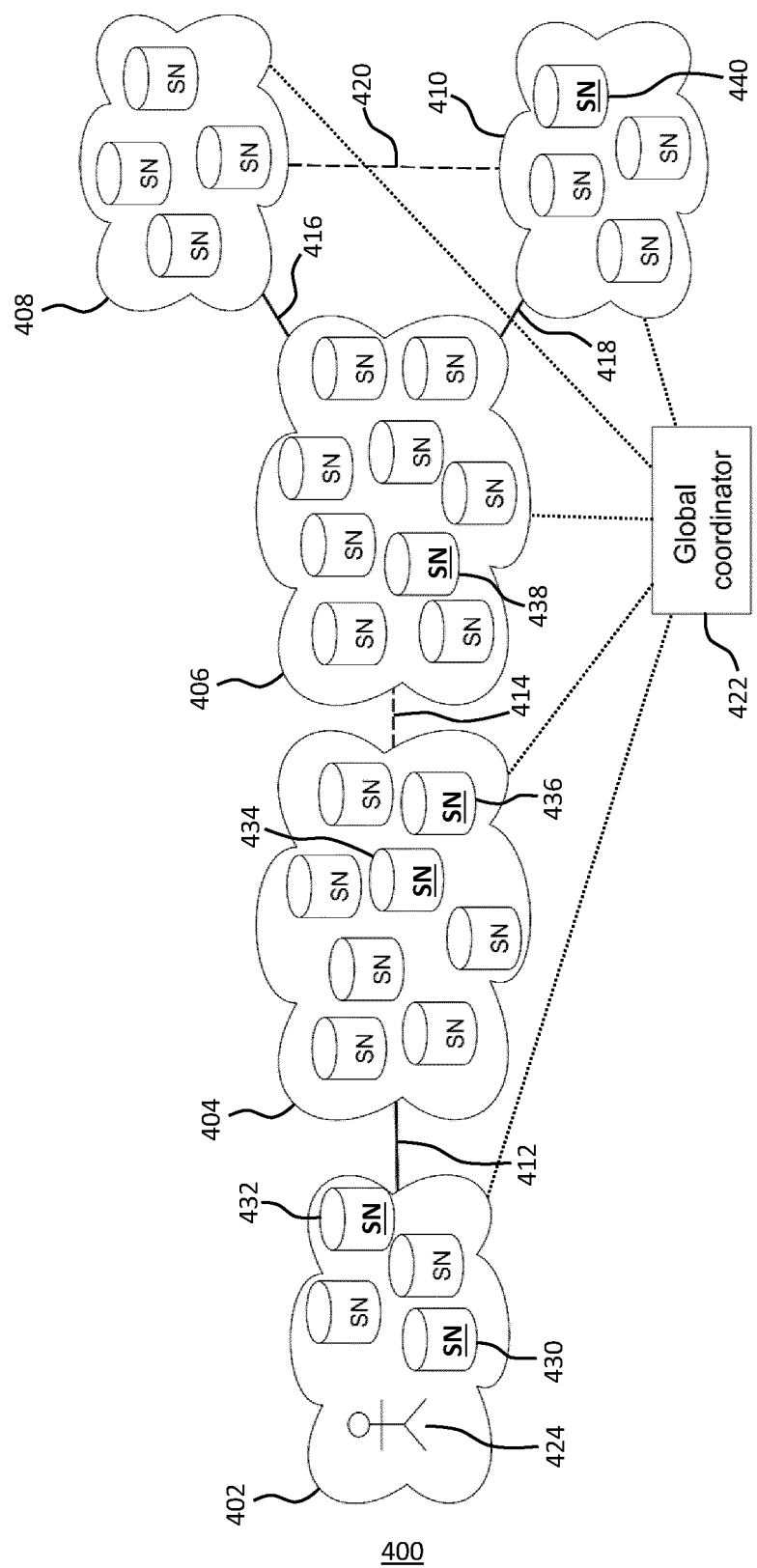
FIG. 4 shows an example of a communication system.

FIG. 4 shows an example of a communication system 400. The communication system 400 includes clusters 402, 404, 406, 408 and 410, where each cluster is associated with a different network operator, although as indicated above, clustering nodes by network operator is one example and other ways of clustering storage nodes are possible. Each cluster includes one or more storage nodes, SNs. Each cluster is within a network that is connected to at least one other network by at least one link, such as a peer or transit link. For example, clusters 402 and 404 are separated by transit link 412 (e.g. a bandwidth limited paid link, with traffic shaping and policies), clusters 404 and 406 are separated by peer link 414 (e.g. with substantially symmetric traffic volumes between the parties without extra payment, traffic is restricted to customer routes, i.e., no transit traffic is allowed), clusters 406 and 408 are separated by transit link 416, clusters 406 and 410 are separated by transit link 418 and clusters 408 and 410 are separated by peer link 420. The number of clusters and their interconnects shown are merely an example, however, and other examples may have any number of clusters that are interconnected in any suitable manner (including using multiple links between clusters in some cases).

In some examples, a global coordinator node 422 may perform the method 300. In the example shown in FIG. 4, the first cluster referred to above that is closest to a data owner 424, which is the source of the data to be stored, is the cluster 402. In the example shown, the data owner 424 is within the cluster 402, for example is connected to the cluster 402 (or to a node in a cluster of nodes that includes the cluster 402) and thus is connected to the communication system 400.

The method 300 comprises, in step 302, receiving, from a node associated with a respective network operator of each of the clusters of storage nodes, information for identifying the clusters of storage nodes. The method 300 also comprises, in step 304, causing each of at least one data block of the n data blocks to be stored in a storage node in the first cluster. The information may comprise for example information identifying one or more of the clusters of data storage nodes and/or information that identifies a network topology of a respective at least part of a network associated with each network operator.

Thus, for example, at least one of the data blocks may be stored in the first cluster so that if the data source or owner, or another node in or connected to the first cluster 402, attempts to retrieve enough blocks (e.g. at least k blocks) to recover the data, then at least one of the blocks may be retrieved from the first cluster instead of from another cluster (which may otherwise use a non-preferred link to download that block). In some examples, at least k data blocks are stored in the first cluster. Thus, for example, enough data blocks may be stored in the first cluster 402 such that a node accessing the data, such as for example the data owner or source, or any node that is connected to the same network or cluster as the first cluster 402, can recover all of the data without needing to access data storage nodes in any other cluster. As a result, there is no need for a node accessing the data to retrieve at least one data block (or in examples where at least k blocks are stored in the first cluster, any data blocks) from other clusters and use links such as bottlenecks, peer or transit links or other non-preferred links. In other examples, the number of blocks stored in data storage nodes in the first cluster may be chosen to be a different number, such as for example as k−1, k−2, k/2 (or the integer part of or nearest integer to k/2), k+1, k+2 or any other value.

In the example shown in FIG. 4, k=2, such that two blocks are required to recover the data. Thus, two data storage nodes 430 and 432 each store a data block (though in other examples, at least one data block may be stored in the first cluster 402). Furthermore, n/k=3, such that six data blocks are stored in total within the communication system 400. The data blocks other than the at least one data block stored in the first cluster 402 may be stored in the communication system in any suitable manner. For example, the method 300 may comprise storing each data block other than the at least one data block in a data storage node in at least one cluster of the plurality of clusters other than the first cluster. This may be any random cluster, which may include the first cluster 402 but in other examples may exclude the first cluster 402. In the example shown in FIG. 4, two blocks are stored in data storage nodes 434 and 436 in cluster 404, one block is stored in data storage node 438 in cluster 406, and one block is stored in data storage node 440 in cluster 410. No blocks are stored in cluster 408 in the example shown.

In some examples, for resiliency purposes, more than k blocks are stored in the first cluster. Thus, for example, the method 300 may comprise storing each of at least k+e data blocks of the n data blocks in a different storage node in the first cluster, wherein e is an integer greater than or equal to 0. If e is greater than or equal to 1, more than k blocks are stored in the first cluster 402. In some examples, therefore, n-k-e blocks are stored in other storage nodes in other clusters or any cluster.

The method 300 may in some examples comprise identifying, the information for identifying the clusters of storage nodes, one or more of the clusters of data storage nodes. For example, the information may be information that identifies a network topology of a respective at least part of a network associated with each network operator, and the network topology may identify storage nodes (or nodes to which the storage nodes are connected) and links within an operator's network, and this information may be used to identify links such as bottleneck or other non-preferred links, etc. Nodes that are not separated by such links can in some examples be grouped in the same cluster. In some examples, the method 300 may comprise sending a request to at least one node (e.g. OAM node) associated with each network operator, and receiving, from the at least one node associated with each network operator, at least some of the information for identifying the clusters of storage nodes. An operator may be the operator of more than one cluster of nodes, and hence the information from a single operator may identify multiple clusters in some examples.

In some examples, a node or device may wish to access the data stored in the communication system 100. Thus, for example, the method 300 may comprise receiving a request to access the data from a data accessing node (which may be the same as the data owner or some other node or device in some examples), and sending information identifying at least k of the data storage nodes to the data accessing node. Thus, the data accessing node may then retrieve the (at least) k data blocks and recover the data. The information identifying the k data storage nodes may in some examples include data blocks that are in a cluster that is closest to (or connected to the same operator network as) the data accessing node. This cluster is referred to as a second cluster. In some examples, however, it may be determined that the number of data storage nodes in the second cluster of data storage nodes that stores at least one of the data blocks is below a threshold number, such as k, or 1 (meaning that no data blocks are stored in the second cluster for that particular data), or a threshold number corresponding to a predetermined share of the k data blocks. The method 300 may then, in some examples, comprise moving or copying at least one of the data blocks stored by at least one of the data storage nodes in at least one of the clusters other than the second cluster to at least one of the data storage nodes in the second cluster. In some examples, the number of moved or copied data blocks is sufficient to store at least the threshold number of data blocks in the second cluster. This may in some examples ensure that future accessing of the data by the data accessing node (or another node or device) when the second cluster is the closest cluster can use more data blocks that are stored in data storage nodes within the second cluster, hence reducing the reliance on non-preferred links. In some examples, there may be some resiliency in the number of data blocks moved or copied to the second cluster. Thus, for example, moving or copying at least one of the data blocks may comprise moving or copying a number of data blocks such that the number of data storage nodes in the second cluster of data storage nodes that stores at least one of the data blocks is at least k or k+x, where x is a number greater than or equal to 0.

In some examples, the data accessing node is located in a second cluster of the plurality of clusters (e.g. the second cluster is closest to the data accessing node, or the data accessing node is connected to a node in the same network as the network to which the second cluster of storage nodes is connected). Sending information identifying at least k of the data storage nodes to the data accessing node may therefore comprises determining that at least one data block is in the second cluster, and including information identifying data storage nodes of the at least one data block in the second cluster in the information identifying the at least k of the data storage nodes. In other words, for example, the storage nodes identified to the data accessing node may prefer storage nodes in the second cluster, where possible. That is, for example, storage nodes in the second cluster are identified first, and if the number of identified storage nodes is fewer than a required number (e.g. k, or k plus some resiliency value such as e described above) then one or nodes in other clusters are also identified to make up the required number. The identified data storage nodes are then identified to the data accessing node, which can download the data blocks from the identified nodes.

In some examples, the method 300 may comprise receiving a request to store the data in the network from the source of the data, and identifying the first cluster 402 that includes the source of the data. This cluster may be identified in any suitable manner. For example, the first cluster 402 may be identified by the data source node (e.g. in the request to store the data), or identified by the coordinator node using information received from the data source node on the location of the data source node in relation to the available clusters.

As indicated above, the method 300 comprises causing each of at least one of the data blocks of the n data blocks to be stored in a storage node in the first cluster. In some examples, this may comprise sending instructions to the source of the data to store each of the at least one data block of the n data blocks in a different storage node in the first cluster (e.g. sending a list of the data storage nodes in the first cluster). This may also comprise sending instructions to store other data blocks in data storage nodes in other clusters (or any cluster). Alternatively, for example, causing each of the at least one data block of the n data blocks to be stored in a different storage node in the first cluster may comprise sending (e.g. from the coordinator node 422) each of the at least k data blocks of the n data blocks to the respective different storage node in the first cluster.

Figure 5:
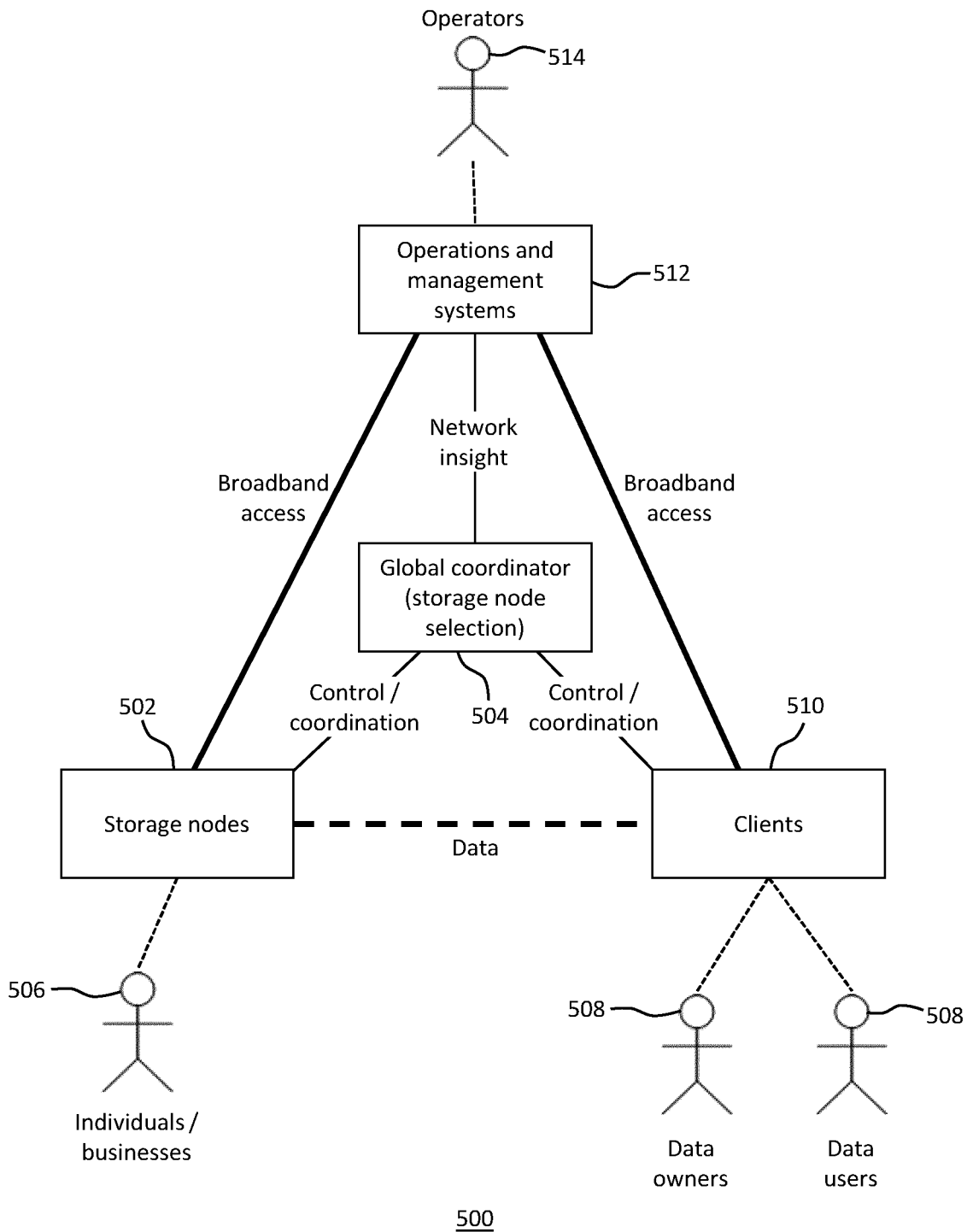
FIG. 5 shows an example of components in an example communication system.

FIG. 5 shows an example of components in an example communication system 500. The system 500 includes storage nodes 502. Storage nodes referred to in this disclosure may be for example devices connected to the Internet via an operator's network and that have available storage capacity. Storage node owners or operators (e.g. individual or business subscribers 506 of the operator) may offer the storage capacity for the system 500 by running software on the storage node device. As the storage node software starts, it will contact the global coordinator 504 (which may be the coordinator 422 shown in FIG. 4 in some examples) and registers itself to the system. The coordinator 504 will know where (e.g. on which IP address) that storage node can be reached, and how much storage is available on that node. The data owner 508 is able to upload, download and share objects (data) through a local client 510. Objects (e.g. data) are stored in blocks on multiple storage nodes 502. From a single object, erasure coding in the client may generate n different data blocks from the data object to be stored, while any k of these data blocks are enough to retrieve the data. During an upload, the client 510 contacts the global coordinator 504 and requests n storage nodes to send the data blocks to. The coordinator 504 may select the storage nodes according to methods as disclosed herein, for example using information from the operation and management (O&M) system 512 of the data owner's operator 514.

The example communication system 500 shown in FIG. 5 shows the block diagram of a single operator setup where all actors are in the same network. The operator 514 has the knowledge of its own network as well as the (network) location of the data owner 508 and the storage nodes 502. Other examples of a communication system according to this disclosure may span across multiple operators' domains, as is shown in FIG. 4 for example. This means that storage nodes will connect to the system from different operator networks, and users may upload or access data from any location. Such a system, however, may require traffic routing across multiple operators. Links between operators may in some examples be considered as a bottleneck resource.

As indicated above, the data owner 508 generates n data blocks from the data to be stored, while k (<n) blocks are required to retrieve the data. When the data owner 508 uploads a data object, in the example shown in FIG. 4, six data blocks are generated. The global coordinator 504 (e.g. the coordinator 422 in FIG. 4) must select six storage nodes from the global pool. If during the selection process, network boundaries between clusters or operators' networks are not considered, the coordinator 504 may select storage nodes that are all from outside of the operator's network to which the data owner 508 is connected. Thus, for example, the six data blocks will be sent over the non-preferred transit link between clusters 402 and 404 shown in FIG. 4. Furthermore, any time the data owner wants to access the data, it will come through the same link. Although data access will retrieve fewer data blocks (e.g. two blocks from the six stored blocks to fully recover the data object), if the data is accessed regularly it can generate a lot of traffic over the non-preferred link(s).

A network-insight based storage node selection strategy, such as for example those disclosed herein, may suggest that the minimum of k or the number of storage nodes in the first cluster nodes are selected from the first cluster where the data was uploaded from (e.g. the first cluster closest to the data source). Because of the churn rate of storage nodes, it is preferable in some examples to keep more blocks in the first cluster than the required k. Selecting an additional e nodes from the first cluster may allow for data recovery using data blocks stored only in the first cluster if at most e nodes are unexpectedly unavailable. In some examples, the value of e can depend on the expected churn rate or the properties of links to other clusters. If the number of data blocks in the first cluster falls below k, the global coordinator node 504 may need to access other data blocks for repair.

After allocating the preferably at least k data blocks in the first cluster, the remaining data blocks may be selected from the global capacity pool. This way, only n-k-e blocks are sent over non-preferred links. In the example shown in FIG. 3, four data blocks are sent over non-preferred links to other clusters.

After uploading the data blocks, a node (the data owner or other node or device) may wish to access the data. On a request to access the data, the coordinator 504 can for example identify at least k storage nodes storing data blocks. If k storage nodes are online, the data can be retrieved. If the cluster that is closest to the data accessing node (e.g. a cluster being connected to the same operator's network or network portion as the data accessing node), referred to as the second cluster in some examples above, is different from the first cluster, then in some examples multiple scenarios are possible. It is possible that there are enough storage nodes in the second cluster because at least k nodes were selected from that cluster during the data upload. This situation is straightforward: the coordinator 504 may simply select k storage nodes from the second cluster from which data blocks can be downloaded. If fewer than k blocks are available in the second cluster, the coordinator 504 must provide some storage nodes (e.g. the remaining number of storage nodes) from other clusters, which may come through a bottleneck or non-preferred link. An extreme situation is that there are no blocks in the target cluster; an example would be a data accessing node in FIG. 3 that has cluster 408 as its closest cluster. Even in such cases, the coordinator 504 (or 422 in FIG. 4) can in some examples provide the most favourable storage nodes to the data user, for example, ones connected to the second cluster over a peer link (e.g. storage node 440) and/or ones from a neighbor cluster (e.g. storage node 438). This way, for example, neighbor clusters don't have to use other less preferred links in order to retrieve the additional blocks, such as if nodes in clusters 402 or 404 were selected in the example.

Figure 6:
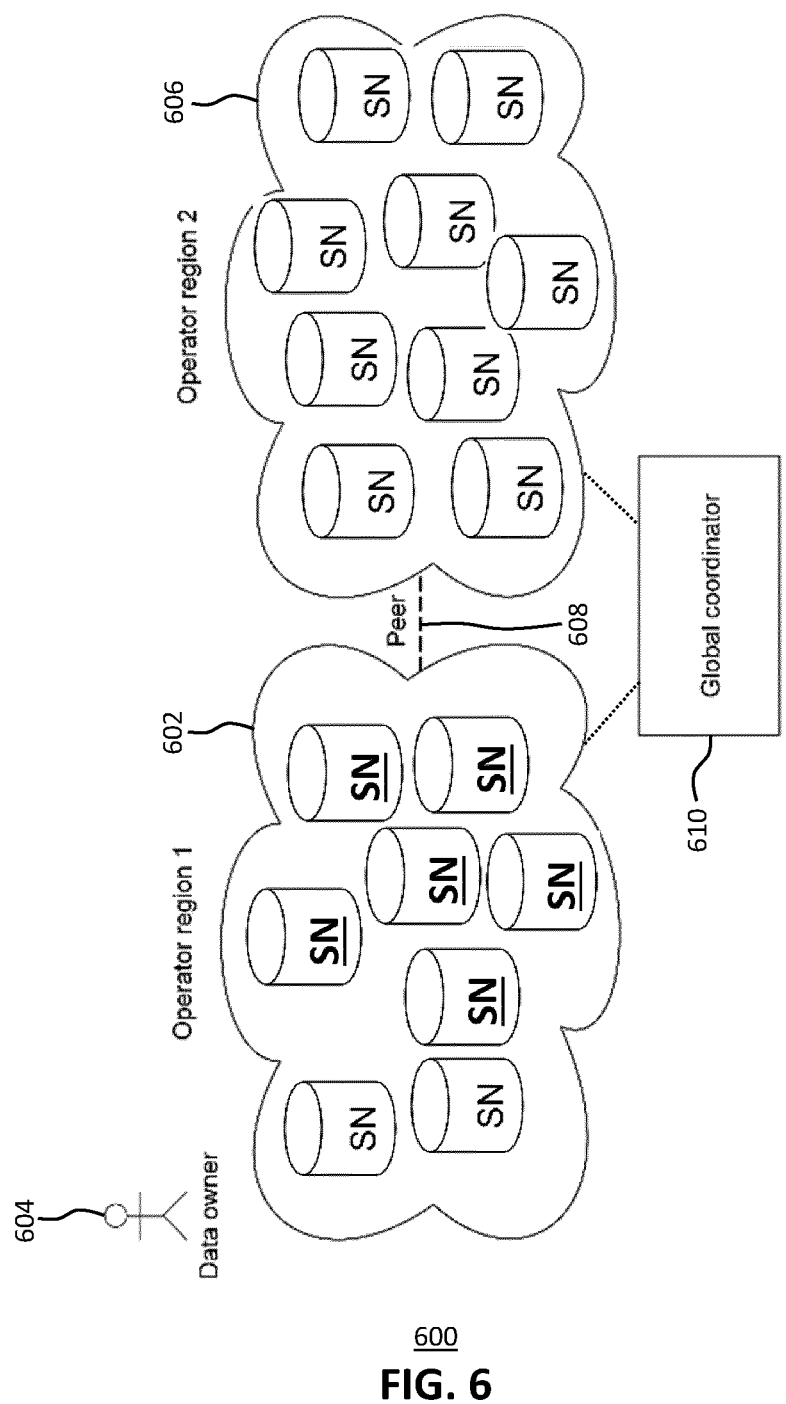
FIG. 6 shows another example of a communication system.

Large-enough operators or clusters may in some examples desire to keep all data blocks inside their boundaries (i.e. within a single cluster) if this doesn't affect resiliency of the system. A different strategy may be applied for storing data blocks in some such examples. Initially, all (or most) of the n data blocks may be stored within this cluster without routing traffic to another cluster or operator; these data blocks may in some examples be distributed within the cluster to ensure resiliency (e.g. the different storage nodes within the cluster may be geographically or electrically separated). An example of this arrangement is shown in FIG. 6, which shows another example of a communication network 600. The communication network 600 includes a first cluster 602, which is closest to a data owner (data source) 604, and also includes a second cluster 606. The clusters 602 and 606 are separated by peer link 608. The communication system 600 also includes global coordinator 610, which may in some examples perform the method 300 of FIG. 3. In the example shown in FIG. 6, a data object is stored as n=6 data blocks, and all blocks are stored in (different) storage nodes in the first cluster 602. This state may be maintained until a node closest to another cluster other than the first cluster 602, e.g. the second cluster 606, would like to access the data. If an access request comes from such a node, instead of identifying storage nodes in the first cluster 602 that may be remote from the data accessing node, the global coordinator 610 can appoint some storage nodes within the second cluster 606 or closer to the data accessing node for coping or moving data blocks. In one example, two (i.e. k) data blocks may be moved to the second cluster 606, where for example two data blocks may be needed to recover the data. This way, the required number of data blocks are sent over the peer link 608, which would be the case when the data accessing node accesses the data. However, if the data is accessed more times from an accessing node that has the second cluster 606 as the closest cluster, the coordinator 610 can avoid any more data blocks being transmitted over the peer link 608 by identifying those storage nodes in the second cluster 606 to which the data blocks were moved or copied. In some examples, fewer than the number of blocks needed to recover the data may be moved or copied, but this would still reduce the traffic over the peer link 608 for further accesses of the data compared to if no blocks were moved or copied.

Figure 7:
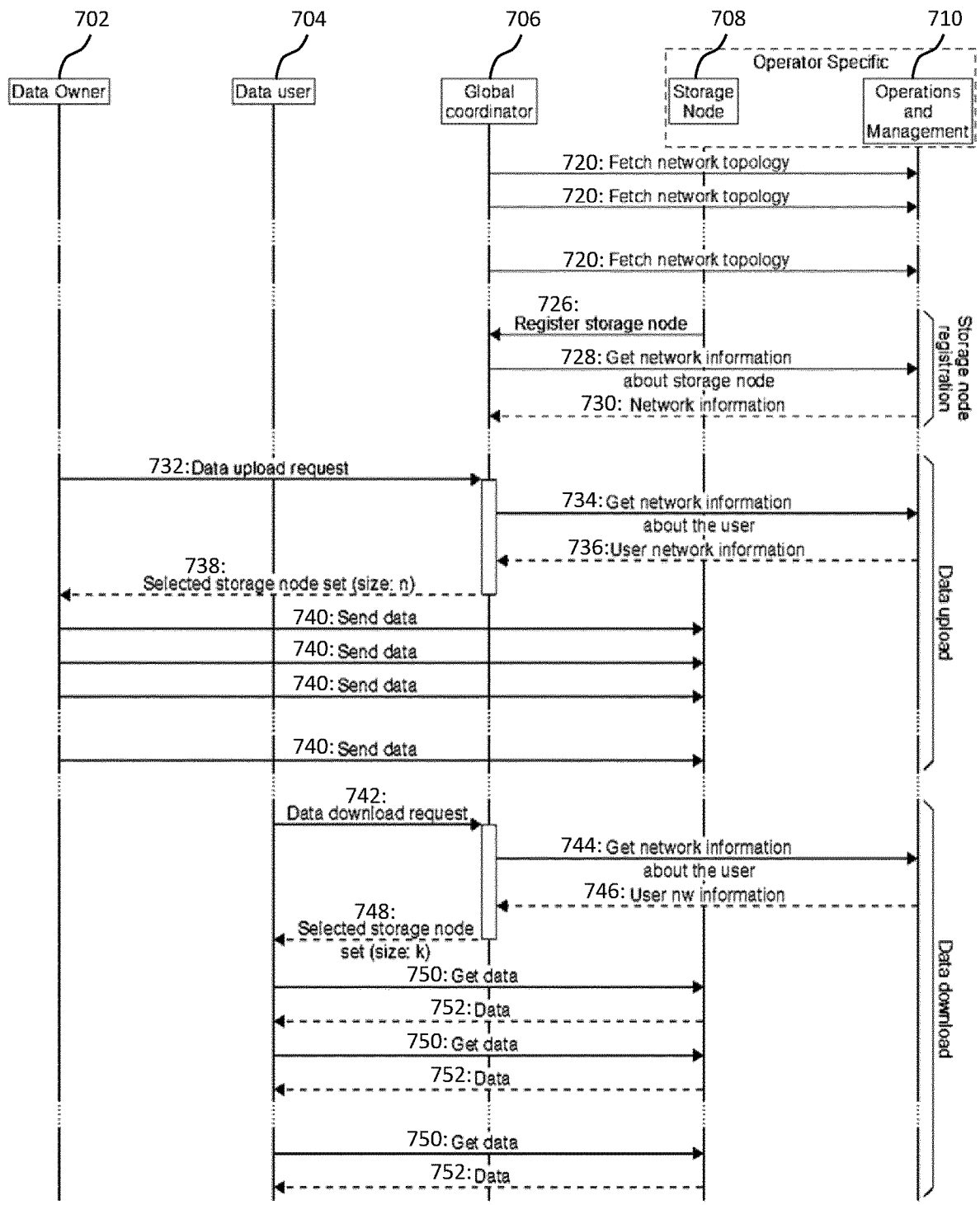
FIG. 7 shows an example of communications within a communication system.

FIG. 7 shows an example of communications 700 within a communication system according to embodiments of this disclosure. The communication system includes data owner (source) 702, data user (data accessing node) 704, global coordinator 706, and operator- or cluster-specific storage node(s) 708 and operations and management (O&M) node 710. In some examples, the global coordinator 706 performs the method 300 of FIG. 3. In some examples, the data owner 702 and data user 704 may be the same entity, but it is possible that they are different.

The global coordinator 706 handles the storage node registration and selection both for uploads (data storage) and downloads (data access). The operations and management node 710 is operator-specific and can provide information about the network operated by an operator (e.g. network topology, administrative or technology areas, domains, usage preferences, IP range or cluster(s) information) and subscribers (e.g. location). In this example, both the storage node operators and the data owners/users are subscribers of an operator. Storage nodes 708 (operated by storage node operators) are connected to the Internet via an operator and offer spare storage capacity through the global coordinator 706 to others.

For the global coordinator 706 to be able to optimize the interdomain traffic it may have a basic knowledge of the operators' networks in some examples. To build this model, the coordinator 706 sends requests in step 720 to fetch network topology information from all connected operators. (In the example shown, three requests are sent to three O&M nodes 710 of three different operators, though in other examples there be any number of one or more operators.) This way, clusters, boundaries and bottleneck or non-preferred resources can be identified. The information returned may be for example the information for identifying the clusters of data storage nodes referred to herein.

For storage node registration, in step 726, the storage node 708 operator initiates the process by registering the storage node to the global coordinator 706 (e.g. by running software). During the registration process, in step 728 the global coordinator 706 will request information (e.g. geo-location) about the storage node from the corresponding operator's operations and management node 710, and this information is returned in step 730.

For data storage or upload, the data owner 702 initiates the process at the global coordinator 706 with a data storage request in step 732. The global coordinator 706 will in step 734 request network information from the operator's O&M module 710 (the operator being for example the operator of the network to which the data owner 702 is connected or the operator of the cluster closest to the data owner 702). The information is returned in step 736. This way, where the data will be uploaded from may be determined and storage nodes 708 selected accordingly. The coordinator 706 will then return to the data owner in step 738 a set of storage nodes selected by an optimization strategy (size of this set is n) such as those disclosed herein, e.g. the method 300 described above. Data owner 702 then encodes the data with erasure coding, and may also encrypt the data or the data blocks, which will results in a set of n data blocks. The data owner 702 then sends each of the data blocks to a different one of the selected storage nodes in step 740. (Four data blocks are shown in this example, though other examples may have a different number of data blocks.)

For data access, which is requested from the global coordinator 706 from the data user 704 in step 742, the global coordinator 706 will query information about the data user 704 from the O&M node 710 of the data user's operator in step 744. The information is returned in step 746, and can be used for example to identify the storage node cluster that is closest to the data user 704. The coordinator 706 then selects k nodes where the data blocks are available according to example methods of this disclosure, and sends information identifying the set of k storage nodes to the data user 704 in step 748. From the returned set of storage nodes, the data user 704 can retrieve the data, which is represented in FIG. 7 in step 750 by the data user 704 sending a request for a data block to each of the k storage nodes 708, and receiving the data block in step 752. If the proper encryption key is known to the data user 704, if the data (or data blocks) is encrypted, the user can decrypt the reassembled data object or the data blocks.

In some examples, the exposure of the network operator to the global coordinator node could use, for example, the Application-Layer Traffic Optimization (ALTO) Protocol by the Internet Engineering Task Force (IETF), for example as disclosed in RFC7285, which is incorporated herein by reference. In some examples, operators can run their own ALTO servers to which the global coordinator node would connect to as an ALTO Client (for example as shown in FIG. 22 in RFC7971, which is incorporated herein by reference).

Alternatively, the exposure of the network operator to the global coordinator node may use a proprietary implementation. For example, communication between individual entities can occur using e.g. HTTPS, but other protocols may alternatively be used. To fetch the network topology from an operator, a shared database may be used for example to continuously synchronize the information by polling the database. The information (which may be an example of the information for identifying clusters of data storage nodes) could be described as a graph for example where the links describe the transport links in the system. For upload and download of data, a route between two nodes in the graph (the user and the storage node(s)) may be found. The global coordinator could fetch further information along with the graph, such as for example information that identifies bottleneck resources or links to avoid (i.e. non-preferred links). This could be represented as a list of link identifiers for example. When information about a data source node (or node requesting data access) is requested or received from the node (e.g. OAM node) associated with the network operator, the information may indicate the node in the topology graph where the requesting or source node is located. This information indicating where a node is located in the graph may also be provided by a network operator, or determined by the coordinator, when a data storage node connects to the data storage system. This way, it can be determined how to route traffic between storage nodes and users for data uploads or downloads.

Figure 8:
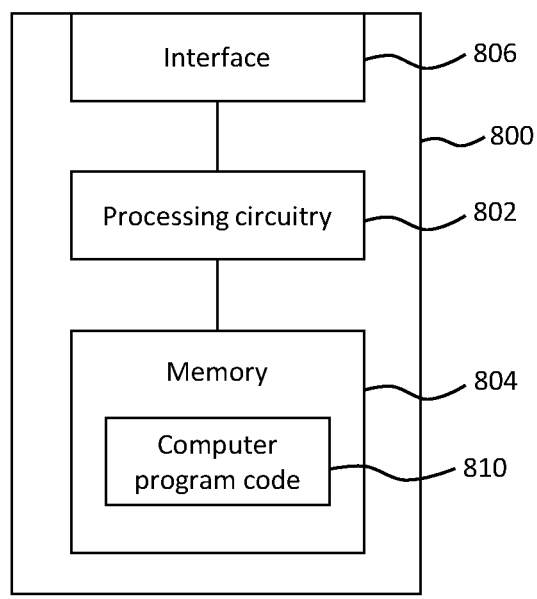
FIG. 8 is a schematic of an example of an apparatus for storing data in a communication system.

FIG. 8 is a schematic of an example of an apparatus 800 for managing data storage in a communication system, wherein the data comprises n data blocks and k data blocks of the n data blocks are required to recover the data, and wherein the network includes a plurality of clusters of data storage nodes including a first cluster that includes a node that is a source of the data. The apparatus 800 comprises processing circuitry 802 (e.g. one or more processors) and a memory 804 in communication with the processing circuitry 802. The memory 804 contains instructions, such as computer program code 810, executable by the processing circuitry 802. The apparatus 800 also comprises an interface 806 in communication with the processing circuitry 802. Although the interface 806, processing circuitry 802 and memory 804 are shown connected in series, these may alternatively be interconnected in any other way, for example via a bus.

In one embodiment, the memory 804 contains instructions executable by the processing circuitry 802 such that the apparatus 800 is operable/configured to receive, from a node associated with a respective network operator of each of the storage nodes, information for identifying the clusters of storage nodes, and cause each of at least one data block of the n data blocks to be stored in a storage node in the first cluster. In some examples, the apparatus 800 is operable/configured to carry out the method 300 described above with reference to FIG. 3.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc. are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. An apparatus for managing the storage of data in a communication system, wherein the data comprises n data blocks, k data blocks of the n data blocks are required to recover the data, wherein n and k are integers greater than zero, and the communication system includes a plurality of clusters of data storage nodes including a first cluster that includes a node that is a source of the data, the apparatus comprising:
a processor; and
a memory, the memory containing instructions executable by the processor such that the apparatus is operable to:
obtain, from a node associated with a respective network operator of each of the storage nodes, information for identifying the clusters of storage nodes;
cause each of at least one data block of the n data blocks to be stored in a storage node in the first cluster;
receive a request to access the data from a data accessing node, and send information identifying at least k of the data storage nodes to the data accessing node, wherein the data accessing node is located in a second cluster of the plurality of clusters; and
in response to receiving the request to access the data from the data accessing node:
determine that a number of data storage nodes in the second cluster of data storage nodes that stores at least one of the data blocks is below a threshold number; and
move or copy at least one of the data blocks stored by at least one of the data storage nodes in at least one of the clusters other than the second cluster to at least one of the data storage nodes in the second cluster.

2. The apparatus of claim 1, wherein the memory contains instructions executable by the processor such that the apparatus is operable to store each data block other than the at least one data block in a data storage node in at least one cluster of the plurality of clusters other than the first cluster.

3. The apparatus of claim 1, wherein storing each of at least k data blocks of the n data blocks in a different storage node in the first cluster comprises storing each of at least k+e data blocks of the n data blocks in a different storage node in the first cluster, wherein e is an integer greater than or equal to 0.

4. The apparatus of claim 1, wherein the information comprises information identifying one or more of the clusters of data storage nodes and/or information that identifies a network topology of a respective at least part of a network associated with each network operator.

5. The apparatus of claim 1, wherein the memory contains instructions executable by the processor such that the apparatus is operable to identify, from the information for identifying the clusters of storage nodes, one or more of the clusters of data storage nodes.

6. The apparatus of claim 5, wherein the memory contains instructions executable by the processor such that the apparatus is operable to send a request to at least one node associated with each network operator, and receive, from the at least one node associated with each network operator, the information for identifying the clusters of storage nodes.

7. The apparatus of claim 1, wherein the threshold number is 1 or k.

8. The apparatus of claim 1, wherein moving or copying at least one of the data blocks comprises moving or copying a number of data blocks such that the number of data storage nodes in the second cluster of data storage nodes that stores at least one of the data blocks is at least k or k+x, where x is a number greater than or equal to 0.

9. The apparatus of claim 1, wherein the data accessing node is located in a second cluster of the plurality of clusters, and sending information identifying at least k of the data storage nodes to the data accessing node comprises:
  determining that at least one data block is in the second cluster; and
  including information identifying data storage nodes of the data blocks in the second cluster in the information identifying the at least k of the data storage nodes.

10. The apparatus of claim 1, wherein each cluster of data storage nodes comprises one or more data storage nodes connected to:
  one or more nodes in a same geographical area;
  one or more nodes in a same network domain;
  one or more nodes that are operated by a same network operator; and/or
  one or more nodes that are separated from other clusters of data storage nodes by one or more links that are non-preferred links, low bandwidth links, high cost links, peer links and/or transit links.

11. The apparatus of claim 1, wherein the node associated with the respective network operator of each of the clusters of storage nodes comprises an Operations, Administration and Maintenance, OAM, node associated with the network operator.

12. The apparatus of claim 1, wherein the memory contains instructions executable by the processor such that the apparatus is operable to receive a request to store the data in the network from the source of the data, and identify the first cluster that includes the source of the data.

13. The apparatus of claim 1, wherein causing each of the at least one data block of the n data blocks to be stored in a storage node in the first cluster comprises:
  sending instructions to the source of the data to store each of the at least one data block of the n data blocks in a different storage node in the first cluster; or
  sending each of the at least one data block of the n data blocks to the respective different storage node in the first cluster.

14. A method of managing the storage of data in a communication system, wherein the data comprises n data blocks, k data blocks of the n data blocks are required to recover the data, wherein n and k are integers greater than zero, and the communication system includes a plurality of clusters of data storage nodes including a first cluster that includes a node that is a source of the data, the method comprising:
  receiving, from a node associated with a respective network operator of each of the storage nodes, information for identifying the clusters of storage nodes;
  causing each of at least one data block of the n data blocks to be stored in a storage node in the first cluster;
  receiving a request to access the data from a data accessing node, and sending information identifying at least k of the data storage nodes to the data accessing node, wherein the data accessing node is located in a second cluster of the plurality of clusters; and
  in response to receiving the request to access the data from the data accessing node:
    determining that a number of data storage nodes in the second cluster of data storage nodes that stores at least one of the data blocks is below a threshold number; and
    moving or copying at least one of the data blocks stored by at least one of the data storage nodes in at least one of the clusters other than the second cluster to at least one of the data storage nodes in the second cluster.

15. The method of claim 14, comprising storing each data block other than the at least one data block in a data storage node in at least one cluster of the plurality of clusters other than the first cluster.

16. The method of claim 14, wherein storing each of at least k data blocks of the n data blocks in a different storage node in the first cluster comprises storing each of at least k+e data blocks of the n data blocks in a different storage node in the first cluster, wherein e is an integer greater than or equal to 0.

17. The method of claim 14, wherein the information comprises information identifying one or more of the clusters of data storage nodes and/or information that identifies a network topology of a respective at least part of a network associated with each network operator.

18. The method of claim 14, comprising identifying, from the information for identifying the clusters of storage nodes, one or more of the clusters of data storage nodes.

19. The method of claim 14, wherein the threshold number is 1 or k and wherein moving or copying at least one of the data blocks comprises moving or copying a number of data blocks such that the number of data storage nodes in the second cluster of data storage nodes that stores at least one of the data blocks is at least k or k+x, where x is a number greater than or equal to 0.

20. A non-transitory computer readable media storing a computer program comprising instructions which, when executed by processing circuitry of an apparatus causes the apparatus to perform the method of claim 14.

* * * * *